United States Patent [19]
Goldberger

[11] 3,716,414
[45] Feb. 13, 1973

[54] 100-WATT FUEL CELL

[75] Inventor: Max Goldberger, Wapping, Conn.

[73] Assignee: Catalytic Technology Corporation, Manchester, Conn.

[22] Filed: Aug. 12, 1970

[21] Appl. No.: 63,070

[52] U.S. Cl. ..............................................136/86 R
[51] Int. Cl. ...........................................H01m 27/00
[58] Field of Search.........................................136/86

[56] References Cited

UNITED STATES PATENTS

| | | | |
|---|---|---|---|
| 3,126,302 | 3/1964 | Drushella | 136/86 |
| 3,328,204 | 6/1967 | Grubb | 136/86 |
| 3,378,406 | 4/1968 | Rosansky | 136/86 |
| 3,146,131 | 8/1964 | Linden et al. | 136/86 R |

Primary Examiner—Winston A. Douglas
Assistant Examiner—H. A. Feeley
Attorney—Rosen & Steinhilper

[57] ABSTRACT

A commercially useful and marketable fuel cell is described. The cell is capable of operating at ambient conditions of temperatures, pressure and the like for long periods of time. The complete cell includes one or more banks of individual cells, each cell including an anode, an air breathing catalytic cathode, and means for controlled feed of fuel and an aqueous electrolyte. The catalytic electrodes may be catalytic silver. A 100-watt commercial fuel cell is described.

4 Claims, 5 Drawing Figures

INVENTORS
MAX GOLDBERGER

BY ROSEN & STEINHILBER

ATTORNEYS

INVENTORS
MAX GOLDBERGER

BY ROSEN & STEINHILPER

ATTORNEYS

100-WATT FUEL CELL

BACKGROUND OF THE INVENTION

In recent years, there has developed the new art of fuel cells in which an appropriate fuel is catalytically decomposed in a cell which produces direct conversion from chemical energy to electrical energy. In the development of this art, there have been two principal directions of activity. In the first place, there have been produced usable fuel cells operating with a fused electrolyte which necessarily means that the cell must operate at a very high temperature. Naturally enough, the high temperature and extremely corrosive fused electrolytes seriously limit the areas of utility for such cells.

In addition to the work with fused electrolyte type cells, there has been experimental work with fuels and electrodes operable at ambient temperatures. At the present time, however, there is not believed to be an existing fuel cell either commercially available or suitable for general use as a source of power and capable of operating at ambient conditions.

One of the specific problems associated with the development of a commercial fuel cell has been the provision of a suitable fuel. It is desirable to have a fuel which is readily available, which is useful in a liquid form and which can be catalytically decomposed in an aqueous electrolyte. Hydrazine hydrate is such a fuel, but it is not believed that hydrazine hydrate has previously been employed in a commercial cell.

GENERAL STATEMENT OF THE INVENTION

It is, accordingly, an object of this invention to provide a new commercially useful fuel cell capable of operating with a liquid fuel in an aqueous electrolyte to produce a reliable, long lasting source of electric power under a wide variety of ambient conditions such as those which may be encountered in cold or hot climates and under many conditions throughout the world. These and numerous other objectives of a commercially satisfactory fuel cell are accomplished by the present invention as described in specification and claims wherein:

In general, the present invention is a commercially useful fuel cell comprising one or more banks of individual electrolyte cells having therein an anode, an air breathing catalytic cathode, means to supply an aqueous electrolyte to the cell, means to supply a liquid fuel to the cell and control means to maintain liquid volumes and concentrations in the cell and to produce electric power at a desired voltage and amperage. The cell is operable with various liquid, water miscible fuels, and a preferred fuel is hydrazine hydrate (64 percent hydrazine; 36 percent water) which can be added to a cell containing an aqueous electrolyte and which operates effectively in the cell when significantly diluted in aqueous electrolyte.

DETAILED DESCRIPTION OF THE INVENTION

Figure 1:
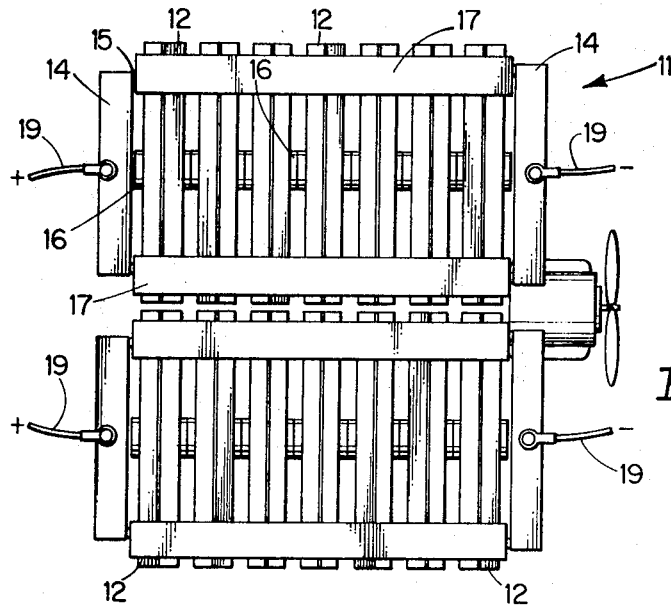
FIG. 1 is a top view, partially in section of a power pack according to one embodiment of the invention.

In FIG. 1 is shown a power pack generally designated 11 according to one embodiment of the invention. The power pack comprises a multiplicity of individual cells 12 mounted in a frame or holder including an electrode bracket 14 positioned at each end of each bank of cells and held together by bars 15 extending from bracket 14 at one end of the bank of cells to the second bracket 14 at the opposite end, and securely mounted thereon. The cells are separated from each other by spacers 16 integrally mounted on each cell. Covers or shields 17 are positioned above the banks of cells to protect electrodes and connections from being splattered with contaminating or corroding materials. Wires or electric leads 19 are mounted at each end of each bank of cells in the power pack to provide the appropriate electrical connections to utilize electricity generated in the cell. In the apparatus illustrated, there are two banks of 14 cells each, adapted to supply 100 watts of output power at a peak output voltage of 28 volts and a working potential of about 12 volts.

Figure 2:
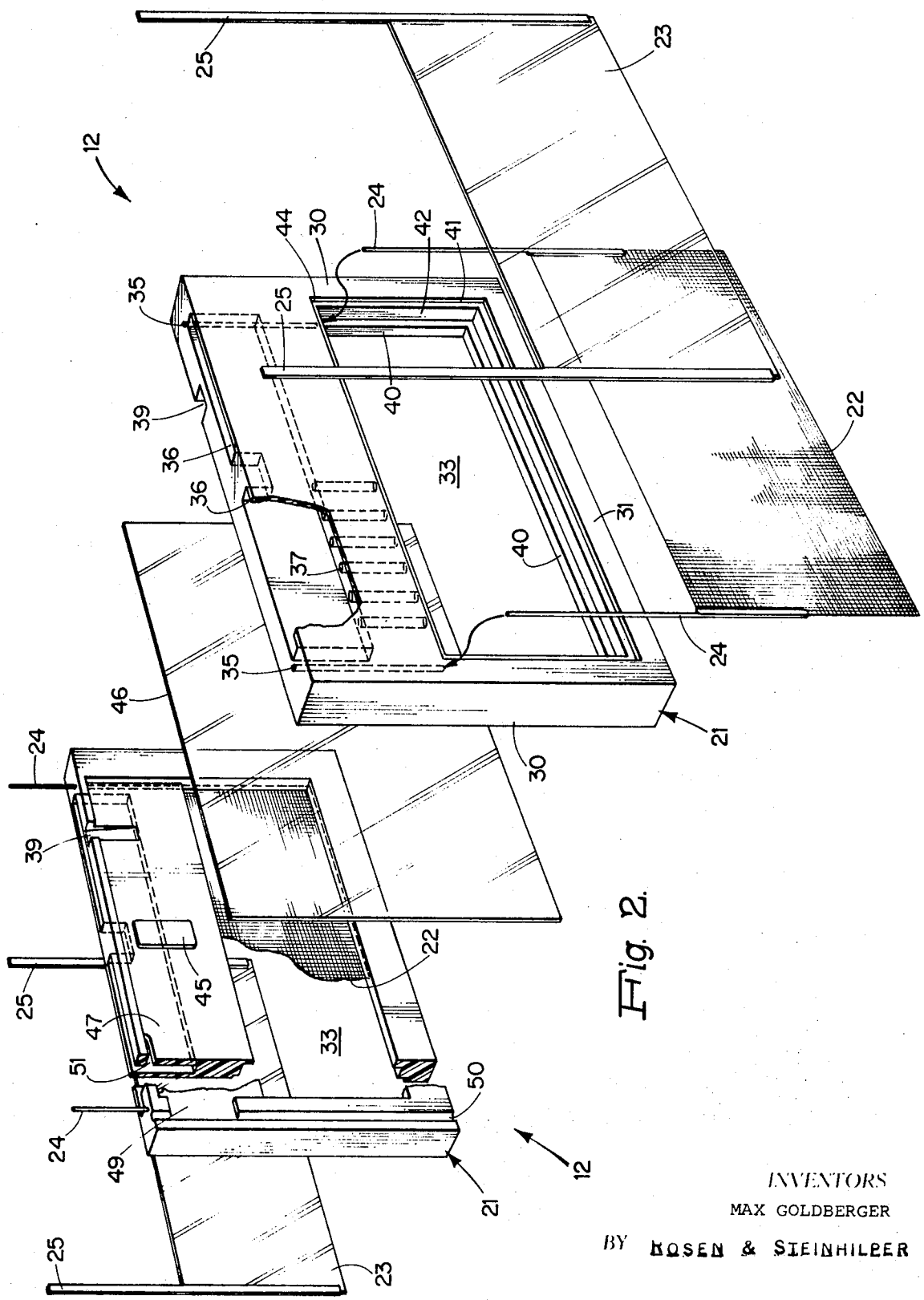
FIG. 2 is an exploded view of a double cell according to one embodiment of the invention.

In FIG. 2 is shown a double cell 12 according to one embodiment of this invention. The double cell comprises two cells blocks 21 positioned to hold anode electrodes 22 near the center thereof and cathode electrodes 23 at the outside walls thereof. When mounted in a power pack as illustrated in FIG. 1, two cells are mounted as a pair or as a double cell with the cathodes 23 at the opposite outside faces, and these pairs of cells are positioned with an air space between each pair so that the cathode electrodes 23 are mounted with one surface facing inwardly to the cell and the other surface facing outwardly to the air. The anode electrode 22 has a pair of electrode leads or contacts 24 extending upwardly therefrom and the cathode electrodes 23 have a pair of cathode electrode leads or contacts 25 extending upwardly therefrom.

The cell block 21 comprises a frame having side walls 30, bottom walls 31 and a top wall 32 surrounding a central opening 33 which is the electrolyte chamber in the assembled cell. A pair of vertical holes 35 extends through the top wall 32 near the ends of the electrolyte chamber and is adapted to receive the anode electrode leads when the anode electrode is in its operating position in the cell block. Hollowed portions or openings in the top wall 32 extend about half way from the top of the cell block to the electrolyte chamber and provide an overflow or feed reservoir 36 for electrolyte in the cell. A plurality of channels 37 positioned vertically in the upper wall between the feed reservoir and the electrolyte chamber allow fuel such as electrolyte fuel or emitted gas to pass freely between the electrolyte chamber and the feed reservoir. A channel or opening 39 is provided to permit primary feed of electrolyte from a fuel source into the feed reservoir.

Surrounding the electrolyte chamber 33 is raised wall or shoulder 40 defining a channel 42. The wall extends entirely around the opening 33 providing corner seals and mounting shoulders by which the electrolyte chamber is tightly sealed against leaks. At the cathode face of the cell is an inset shoulder 44 shaped and adapted to receive the cathode electrode 23 in such a way that the cathode electrode seals off the electrolyte cell opening and itself forms an external wall of the cell. On the opposite side of the cell block is a support flange 45 flush with the face of the cell block whereby an electrically inert and nonpolar wall member 46 may be placed against the face of the cell block and is held in place to seal off this side of the cell. Above the electrolyte cell 33 is a second feed reservoir 47 defined by wall 46 and a recessed portion of the cell block 21. An overflow opening 49 communicates with a vertical groove 50 in the cell block, whereby overflow fluid from the electrolyte cell can be drained away. A plurality of openings 51 extend transversely through the upper wall 32 communicating between the first fuel reservoir 36 and the second fuel reservoir 47. On the back side of the cell, not shown in FIG. 2, is a spacer 16 (see FIG. 1) such that a double cell can be mounted in a cell bank with a controlled space therebetween.

To assemble the cell, the anode electrode 22 is placed within the opening 33 of the electrolyte cell with its electrode leads 24 extending upwardly through holes 35 and projecting thereabove. The cathode 23 is fitted into its support opening at the cathode face of the cell block 21 with its leads extending upwardly above the cell and spaced from the anode leads. A cell wall 46 or electrically inert wall member is positioned at the opposite face of the cell to complete one cell unit. Desirably, two cell units are placed together with a single cell wall 46 operating as the common back wall of both cells. When thus assembled, each cell has a cathode electrode positioned to form one cell wall with an air space on the outside and with the electrolyte chamber inside the cathode. An anode electrode 22 is positioned essentially in the middle of the electrolyte cell and a back wall 46 completes the sealing off of the cell. Upper feed reservoirs communicate with the electrolyte cell in such a way as to feed the electrolytic liquid and fuel to the cell as will be described hereinafter.

Figure 3:
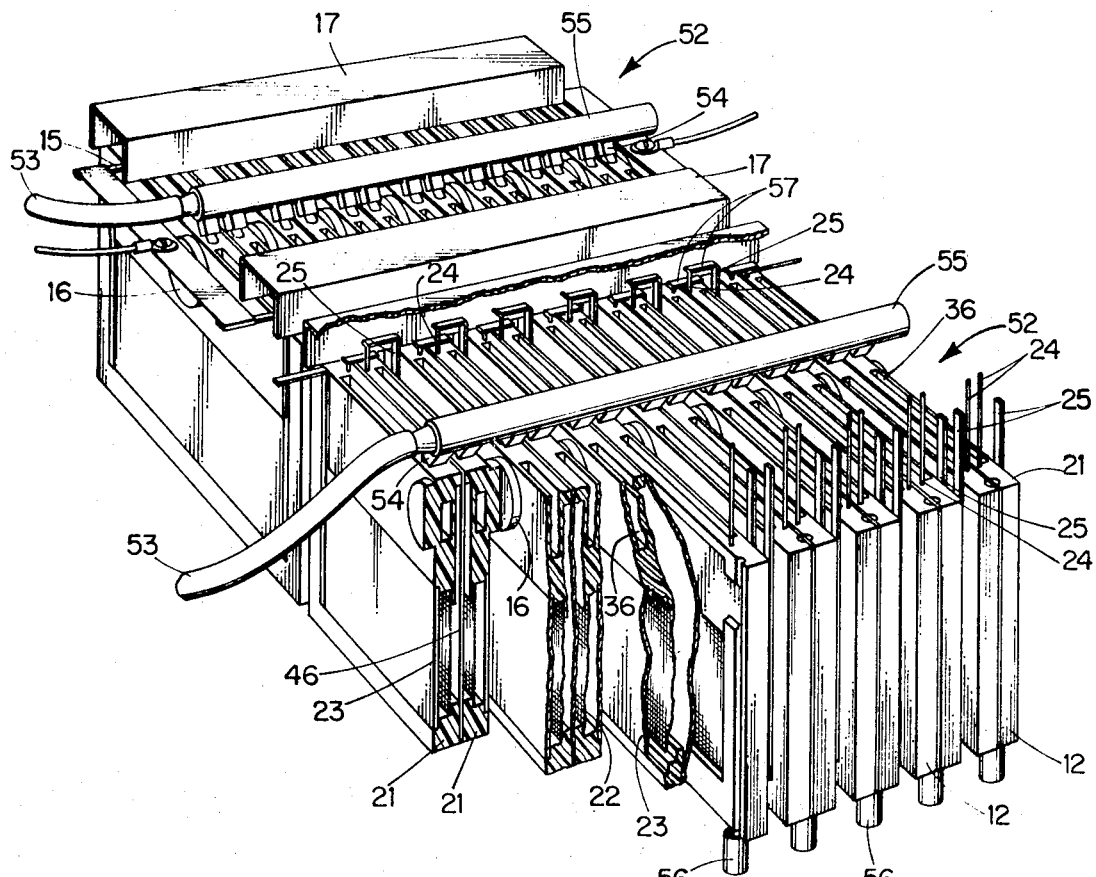
FIG. 3 is an isometric view of a power pack comprising a double bank of cells according to one embodiment of the invention.

In FIG. 3 is illustrated an assembly comprising two banks of cells representing a power pack assembly for a 100-watt fuel cell. The assembly includes a plurality of cells 12 arranged in two banks 52 representing a total of 28 cells which make up the 100-watt fuel cell. Each bank of cells comprises 14 individual cells mounted in pairs with each pair spaced apart by spacers 16. In each pair of cells there is a cell block 21 back-to-back with a second cell block 21, with a common wall 46 therebetween. In each cell is an anode electrode 22 and a cathode electrode 23 which forms an outer wall of the cell, all as described in connection with FIG. 2.

In each bank of cells, a fuel input line 53 is mounted to deliver a liquid fuel into feed reservoir 36 through an individual fuel nozzle 54 operably mounted on fuel manifold 55. Similarly, at the base of the cells, is an overflow manifold 56 having a plurality of input nozzles 57 which are plugged into the base of the vertical grooves or overflow tubes 50. A pump (see FIG. 4) is controlled to feed additional fuel through input line 53 to the cell and to convey overflow liquid to a reservoir (see FIG. 4).

Projecting upwardly out of the individual fuel cells are the anode electrode leads 24 and the cathode electrode leads 25 positioned under the protection of covers or shields 17. In the 100-watt fuel cell unit, these anode and cathode leads are electrically series-connected so that the voltage output of the unit is equal to the sum of the voltage outputs of the individual cells. In the unit as described with 28 cells, the total voltage output is controlled at 28 volts open circuit and 12 volts under constant load at 10 amps constant current.

Figure 4:
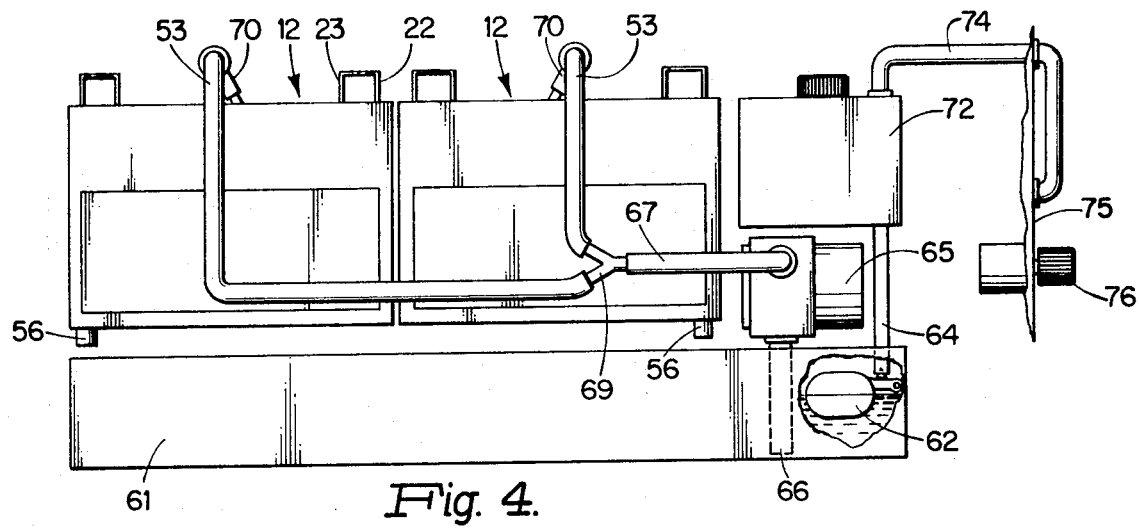
FIG. 4 is a diagrammatic representation of a 100-watt fuel cell according to one form of the invention.

In FIG. 4 is illustrated in diagrammatic form an entire 100-watt fuel cell according to one embodiment of the invention. According to this embodiment of the invention, two banks of cells generally designated 12 are positioned above a tray or fuel reservoir 61 positioned at the base of the unit. A fuel level control device such as a float 62 operating a valve or other mechanism to introduce fuel from a fuel input line 64 is positioned in the fuel reservoir and is adapted to maintain the level of the fuel in the reservoir at a suitable and convenient level. More sophisticated means of fuel control, such as electronic control may be employed, but were found unnecessary. A pump 65 is positioned in or near the fuel reservoir and is adapted to draw fuel through the pump inlet tube 66 and circulate the fuel through a fuel conduit 67. According to the embodiment shown, which has two banks of fuel cells, a Y connector 69 spreads the flowing fuel into the individual fuel input lines 53 where they are fed through nozzles 70 into the individual cells. When the fuel cell is in operation, the fuel flows through the lines, is fed into the cells through nozzles 70 and flows through overflow drain tubes 56 and is thus returned to the tray or fuel reservoir 61. An internal fuel tank 72 may contain sufficient fuel for several hours of operation or, if desired, an external tank of large size such as for example, a 55-gallon drum of fuel may be employed.

Electrical controls (not shown) may be employed to control the current flow or output voltage of the cell and there is indicated in FIG. 4 a protected electric lead 74 leading from the fuel cell mechanism through a wall 75 of a cabinet enclosing the fuel cell to an external dial and control knob 76 which may regulate voltage, turn the mechanism on and off or otherwise control the mechanism of the fuel cell. The specific electrical controls do not form part of the present invention.

Figure 5:
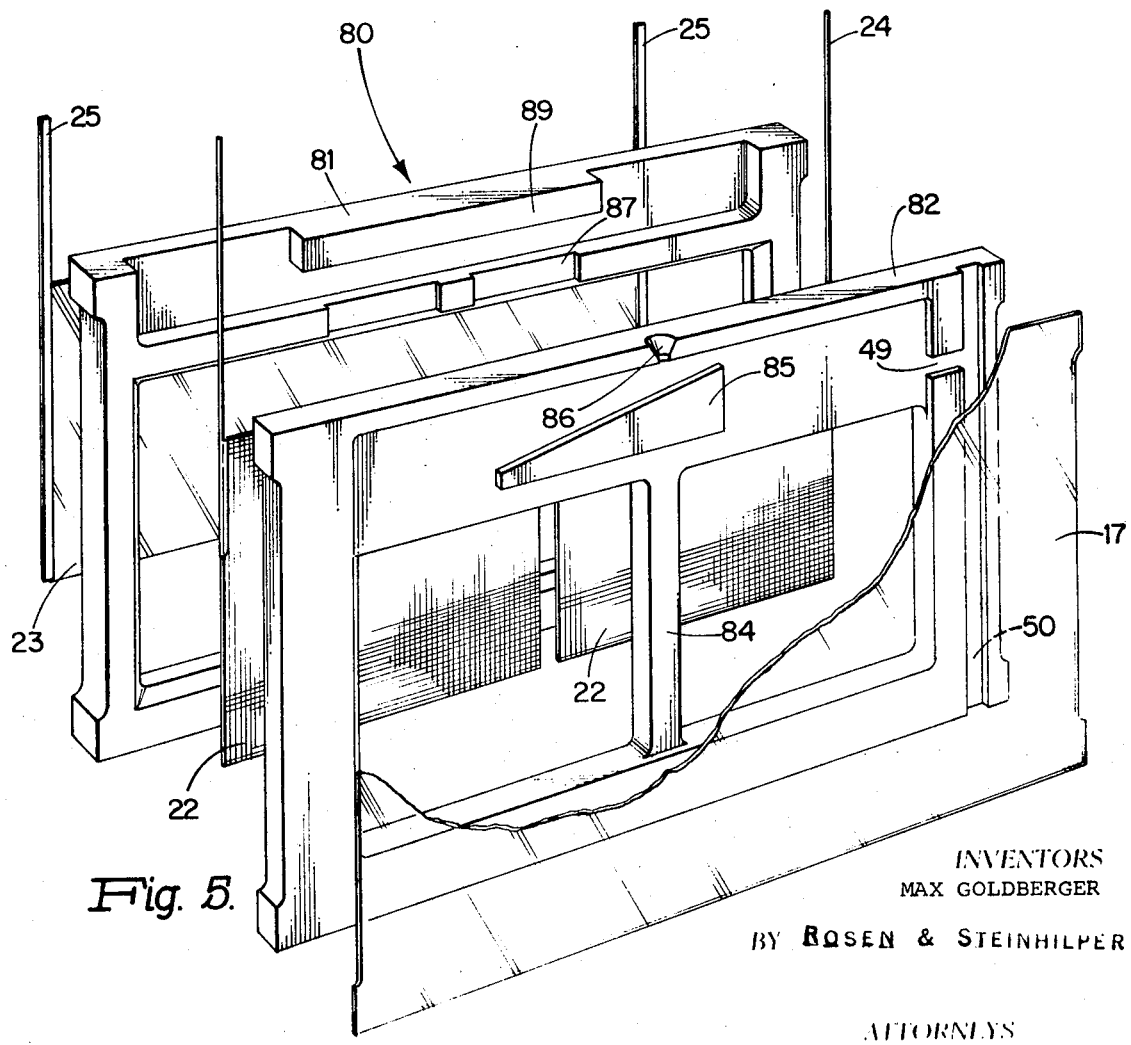
FIG. 5 is an exploded view of a cell according to another embodiment of a cell.

In FIG. 5 is illustrated a fuel cell unit generally designated 80 comprising a cathode cell frame 81 and an anode cell frame 82 on which are positioned a cathode electrode 23, two anode electrodes 22 and a plastic cover 17. When assembled, this structure forms a fuel cell adapted to be placed face to face with a second cell to form a fuel cell pair as in FIG. 2.

The anode cell frame 82 is divided by means of a vertical support member 84 to receive two anode electrodes 22. These anode electrodes 22 are fitted against the face of the cathode cell frame which is positioned against the cathode cell. The vertical support member 84 is recessed so that a single supply of anode cell fluid circulates to be in contact with both of the anode electrodes 22. Openings in the anode cell frame are adapted to receive the anode electrode and to present anode cell fluid such as a fuel at one side of the anode electrode surface. Mounted on the anode cell frame above the openings is a guide and fuel director 85 which serves several purposes. First, it forms a spacer for the plastic cover 17. Second, it is positioned directly below fuel inlet 86 and slanted away from fuel overflow opening 49, whereby fuel entering through fuel inlet 86 is caused to circulate counterclockwise (as shown in FIG. 5) through the fuel cell and then out through the overflow opening after it has circulated through both halves of the anode cell. A vertical groove or overflow tube 50 connects with overflow drain tubes 56 (see FIG. 4) to guide overflow fuel from the anode to the fuel reservoir 61.

The cathode cell frame 81 is adapted to receive a cathode electrode 23 on its face away from the anode cell and positioned at the outside of the cell unit so that the cathode is in a position to breathe air. A cathode cell opening is positioned and adapted to receive the cathode electrode and to form a cell or reservoir which may for example, be aqueous potassium hydrazine or other electrolyte. Above the cell openings are recessed electrolyte feed openings through which electrolyte may be added to place the cell in condition for operating or to replenish electrolyte during operation.

The cathode electrode 23 comprises catalytic material formed into electrode shape and structure and having conductive leads 25 extending therefrom, and the anode, according to one preferred embodiment of the invention, similarly comprises a catalytic material formed into electrode shape and structure and having lead 24 extending therefrom. The cathode is formed of a catalytic metal which is capable of receiving a source of oxygen such as air and transforming it into a useful oxidizing source within the electrolyte. A suitable cathode is disclosed and claimed in co-pending application Ser. No. 687,562 filed Dec. 4, 1967 now abandoned. The anode may be a catalytic member such as disclosed and claimed in co-pending application filed on or about June 2, 1970 and entitled RANEY METAL SHEET MATERIAL, Ser. No. 43,220 now U.S. Pat. No. 3,637,437 or the above-identified co-pending application Ser. No. 687,562 filed Dec. 4, 1967, now abandoned. In addition, other methods may be employed to form either a cathode or anode.

It has been found that catalytic silver is a presently preferred electrode for the cathode and for one presently preferred embodiment of the anode according to the present invention. Catalytic silver may be formed into an electrode in any of several methods. For example, an alloy of the catalytic metal such as silver with a chemically active metal (capable of being easily leached out of an alloy) such as aluminum may be formed into a desired shape either alone or supported on a substrate such as preferably a wire screen. The chemically active metal then is leached out of the structure, to form in effect, a Raney metal catalyst such as Raney silver. Such electrode formation is disclosed and claimed in co-pending application Ser. No. 687,562 filed Dec. 4, 1967, now abandoned, and in the above-identified application filed on or about June 2, 1970 entitled RANEY METAL SHEET MATERIAL Ser. No. 43,220, now U.S. Pat. No. 3,637,437. According to another method of forming an electrode, a silver compound from which the non-silver elements can be partly or largely removed is formed into electrode shape optionally with a supporting member included therein such as a wire screen or the like. For example, silver carbonate or certain other silver salts can be formed into the shape of an electrode and heated to bring about thermal decomposition, desirably in the presence of a reducing agent. If such a procedure is employed, it is preferred to employ as the reducing agent the fuel which ultimately is to be employed in the fuel cells. Thus, decomposition of silver carbonate to form a catalytic electrode for the present cell is advantageously accomplished in the presence of a small quantity of hydrazine.

In addition to these methods of preparing a cathode or an anode, there may be employed a specially prepared catalytic silver powder which can then be formed into an electrode by coating on a substrate surface, pressing, compacting or otherwise treating the formed electrode to cause it to be self-supporting under operating conditions. Depending on the desired use of the electrode, there may be employed a porous resin binder such as for example, a polyfluoro resin such as for example, Teflon. Resins such as hexafluoropropylene, chlorotrifluorothylene and interpolymers thereof are typical of the class of resins which are presently preferred, although generally speaking, there may be employed any resin porous to air and capable of retaining the aqueous electrolyte without leaking.

Illustratively, commercially available silver carbonate is mixed with a solution of roughly equal parts of acetic acid and water. This mix is stirred until foaming stops. Thereafter, hydrazine hydrate (64 percent hydrazine) is added with stirring until finally, the silver particles settle to the bottom of the container. The silver is washed to remove hydrazine and is oven dried at 180° to 200° C. The product is highly catalytically active silver particles which appear porous under a high power microscope.

In another method, silver is prepared from commercially available silver nitrate. In a laboratory scale operation, 100 grams of silver nitrate is dissolved in 125 ml. of distilled water. Fifty milliliters of acetic acid is added slowly with stirring and hydrazine hydrate is added dropwise. A white foam builds up very quickly with the addition of about 10 ml. of the hydrazine mixture. The hydrazine hydrate is added until the mixture is creamy and smooth and then the entire contents stirred into a large quantity of water. Additional hydrazine is added until silver is deposited as powder in the bottom of the container. This requires a total of about 20 ml. of hydrazine hydrate. The silver in the bottom of the container is then washed to remove hydrazine and oven dried at about 180° to 200°C.

A similar procedure can be followed starting with commercially available silver powder which is washed or dissolved in a suitable material and then treated with hydrazine hydrate.

To form a cathode from the silver powder as thus prepared, the powder is placed on a layer of powder of polyfluoro resin and pressed and heated. For example, a layer of about 1 inch thick of duPont 2B Teflon powder is spread over an area of 100 square centimeters. On top of this powder is placed a uniform layer of 30 grams of silver powder. The layered powders are pressed at 9,000 lbs. per 100 square centimeters at 325° C. for 15 minutes. The pressed layer is then held flat with a light weight and allowed to cool. It is then put in a press at 100,000 lbs. per 100 square centimeters. To complete the formation of a suitable cathode for the 100-watt fuel cell, conductive leads such as nickel wire are secured to the flat electrode body. If desired, an electrode in this manner can be employed as an anode as well as a cathode; it is preferred, however, to employ a somewhat different electrode as anode.

An anode can be prepared of the same silver powder prepared by any of the above described methods. In a preferred procedure, a support material such as a metallic screen, preferably nickel, is employed as a means to supply a conductive support base. To prepare an anode of 100 square centimeters area, 15 grams of the silver powder is spread out in a layer on a suitable metallic support. The 100 square centimeters metal screen is then placed on this layer and an additional 15 grams of silver powder is spread out on top of the screen. All the layers, of course, should be as uniform as possible. The assembly comprising a metal screen with silver powder both above and below is then pressed in a die and shaped at 200,000 lbs. per 100 square centimeters at room temperature. It is then pressed without the die at 50,000 lbs. per 100 square centimeters at 450° for 10 minutes. Conductive leads are attached, preferably prior to pressing.

According to another preferred embodiment of the invention, there may be employed an anode which is not noted for its catalytic properties. For example, a porous nickel anode has been used with surprising success. A pressed and sintered catalytic silver powder anode on a nickel mesh support has yielded a current flow of up to 8 amperes or more per 100 square centimeters for a long period of time, and can yield a current flow of up to about 4 amperes per 100 square centimeters virtually indefinitely without polarization. Under like conditions, a porous nickel anode not specially treated to produce catalytic properties has yielded a current flow up to about 5 amperes per 100 square centimeters virtually indefinitely. Other anode electrodes, according to this invention, showing good properties are porous stainless steel, porous noble metals such as palladium, platinum or the like, and other porous metals resistant to chemical attach by the highly caustic electrolyte and made from metals higher in the electromotive series than hydrogen.

It is presently believed that the anode 22 must be porous in the embodiments illustrated in FIG. 2 and FIG. 5, at least for the reason that the fuel is supplied behind the anode electrode. The fuel is then decomposed as it penetrates the anode and comes to the electrolyte surface.

I claim:

1. A fuel cell comprising a cell block having end walls and a bottom wall forming outer walls of a fuel chamber and an electrolyte chamber, an anode electrode mounted on said block in position to separate the fuel chamber from the electrolyte chamber, and forming a common internal wall of the fuel chamber and the electrolyte chamber, means to supply an aqueous electrolyte to said electrolyte chamber, means to circulate a liquid fuel to and recirculate said fuel from the fuel chamber, said fuel circulation means including a fuel input means at the top of the fuel chamber, fuel discharge means at one end of the fuel chamber to discharge fuel from the fuel chamber, and a downwardly inclined fuel directing baffle positioned below the fuel input means to receive fuel by gravity flow from the fuel input means and to direct fuel downwardly and toward the other end of the fuel chamber away from the fuel discharge means, causing the fuel to flow in a circular path within the fuel chamber over substantially the entire surface of said anode, an external side wall mounted on said block to form an external wall of said fuel chamber, and an air breathing cathode defining an external wall of said electrolyte chamber and positioned with one face thereof in contact with said electrolyte and another face thereof facing externally from said cell block.

2. A fuel cell as set forth in claim 1, wherein said cathode comprises catalytically active silver and an air-porous resin.

3. A fuel cell as set forth in claim 2, wherein said anode electrode is a porous electrode of catalytically active silver powder formed into an electrode structure.

4. A multi-cell fuel cell comprising a multiplicity of pairs of individual cells according to claim 1, said individual cells being mounted in pairs, said cells in each pair being mounted face to face, with the cathode electrodes being outwardly facing in each pair.

* * * * *